United States Patent Office 3,541,231
Patented Nov. 17, 1970

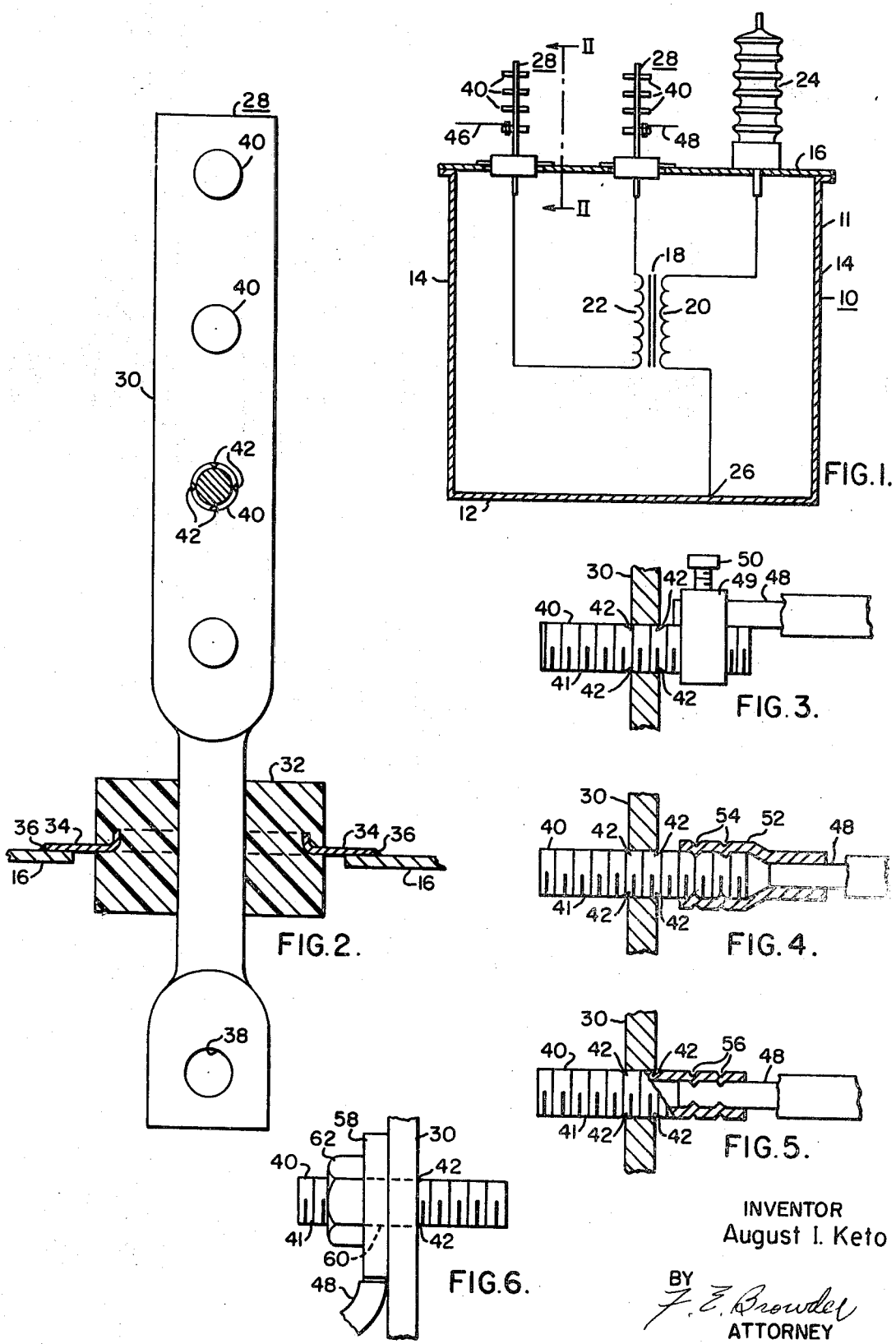

3,541,231
ELECTRICAL TERMINAL PROVIDING A
PLURALITY OF CIRCUITS
August I. Keto, Sharpsville, Pa., assignor to Westinghouse
Electric Corporation, Pittsburgh, Pa., a corporation of
Pennnsylvania
Filed Jan. 7, 1969, Ser. No. 789,537
Int. Cl. H01b 17/26
U.S. Cl. 174—152         3 Claims

ABSTRACT OF THE DISCLOSURE

An electrical terminal assembly for connecting a plurality of load circuits to electrical apparatus housed in a casing. The terminal assembly comprises a first elongated electrical conductor cast through an insulating member, with a flange for mounting the terminal assembly on a casing cast into the insulating member. The lower end of the first electrical conductor extends into the casing and is connected to electrical apparatus housed in the casing. The upper end of the first electrical conductor extends outside of the casing and has electrically connected thereto a plurality of spaced studs or second electrical conductors located substantially transverse to the first electrical conductor. Each of the studs or second electrical conductors has portions extending on at least two sides of said first electrical conductor. A load circuit may be electrically connected to each of the portions of the studs or second electrical conductors which extend beyond the sides of the first electrical conductor.

BACKGROUND OF THE INVENTION

Field of the invention

This invention relates to a terminal assembly of the type particularly useful for connecting a plurality of load circuits to the secondary of a distribution transformer which is installed underground or at ground level.

Description of the prior art

In the prior art, distribution transformers which are installed below ground or at ground level usually have a pair of secondary terminal assemblies which terminates in either a single terminal, a double terminal, or a space with two or more holes. In each of these installations a multiplicity of low voltage services for supplying a multiplicity of customers cannot be taken off the terminal assemblies without using a plurality of auxiliary connectors. These auxiliary connectors must be attached in some manner to the terminal assembly which brings the low voltage leads out of the transformer casing. This type of installation is expensive and becomes very cumbersome if a number of customers are supplied from the same transformer. This creates an added expense for the utility supplying the customer and also makes for a very cumbersome installation at the transformer location.

The above referred to objections to the prior art have been eliminated by this invention. This invention provides terminal assemblies for bringing the secondary leads of the transformer out of the casing which provides neat terminals for connecting a plurality of secondary load circuits to each terminal for supplying power to a plurality of customers without requiring the expense of auxiliary connectors. A plurality of load circuits may be connected to each terminal in an orderly and permanent fashion. This is done by providing a plurality of studs or second electrical conductors on each of the secondary terminals. One side of a secondary load circuit may be connected to each side of the plurality of studs or second electrical conductors.

SUMMARY OF THE INVENTION

This invention overcomes the objections to the prior art terminal assemblies for distribution transformers installed at ground level or underground by providing secondary terminal assemblies for the transformer which has a plurality of terminal studs or second electrical conductors which permit the connection of a plurality of load circuits to each of the terminal assemblies without requiring auxiliary connectors or other makeshift or on the spot installations. This permits not only a quick and easy connection of a customer's service lines but also provides a neat and orderly installation which eliminates many of the hazards which may be inherent in some makeshift installations using a plurality of auxiliary connectors. This is accomplished by providing a terminal assembly comprising a first elongated connector cast into an insulating member. The insulating member has a flange cast therein which is used for installing the terminal assembly on the casing of a transformer by welding the flange to the transformer casing. The lower or first end of the first elongated electrical conductor is attached to the secondary winding of the transformer. The upper or second end of the first elongated electrical conductor has electrically attached thereto a plurality of spaced studs or second electrical conductors which are threaded into the first elongated electrical member. Each of the studs or second electrical conductor members has a portion which extends from two sides of the first electrical elongated member. The portions of these studs or electrical conductor members which extend from the sides of the first elongated electrical conductor member outside of the transformer casing provides convenient connections for connecting a plurality of load circuits to each of the terminal assemblies. In a normal installation the usual distribution transformer would have two such terminal assemblies and one side of each load circuit would be taken from each of the terminal assemblies. This arrangement provides for connecting a plurality of separate customers to the secondary of the distribution transformer without requiring a plurality of auxiliary connectors for connection to the secondary terminals of the transformers. This invention also provides a neat and orderly installation which is less hazardous to service people than the prior art installations.

BRIEF DESCRIPTION OF THE DRAWINGS

FIG. 1 of the drawing is a sectional view of a conventional distribution transformer having two of the terminal assemblies provided by this invention installed thereon;

FIG. 2 is a view taken along the line II—II of FIG. 1;

FIG. 3 is a detail of one of the studs or second electrical conducting member used on the terminal assembly of this invention, illustrating how a load circuit may be connected thereto;

FIG. 4 is a detailed view similar to FIG. 3 illustrating another method for connecting a load circuit to a terminal assembly provided by this invention;

FIG. 5 is a detailed view showing a still further method for connecting a load circuit to a terminal assembly provided by this invention; and, FIG. 6 is a detailed view showing how a load circuit having a flat terminal is attached to a terminal assembly provided by this invention.

DESCRIPTION OF THE PREFERRED EMBODIMENTS

Throughout the description which follows like reference characters illustrate like elements on the various figures of the drawing.

FIG. 1 illustrates a conventional single phase distribution transformer 10 utilizing the terminal provided by this invention.

The transformer 10 comprises a housing or casing 11 having a bottom 12, side walls 14 and a top wall 16. The transformer 10 also includes a magnetic core 18, and a primary winding 20 and a secondary winding 22 associated with the magnetic core 18. The transformer 10 is usually insulated and cooled by means of some satisfactory fluid dielectric contained in the casing 11 and surrounding the core 18 and windings 20 and 22. High voltage is connected to one end of the primary or high voltage winding 20 by means of a terminal assembly 24 which extends through the top wall 16 of the casing 11. One end of the primary or high voltage winding 20 is connected to the terminal assembly 24 and the other end of the high voltage winding 20 is connected to the bottom wall 12 of the casing 11, as indicated at 26. The casing 11 is usually at ground potential.

The secondary winding or low voltage winding 22 of the transformer is connected to a pair of terminal assemblies 28. Service to customers is connected to the transformer 10 by connecting the customer's service lines to each of the terminal assemblies 28.

Each of the terminal assemblies 28 comprises a first elongated electrical conducting member 30 which may be made of aluminum, copper or other suitable conducting material. The elongated conductive member 30 is cast through an insulating member 32 and hermetically seals to the member 32. This insulating member 32 may be made of any suitable casting resin, such as epoxy or other compatible resins. Also cast into the insulating member 32 is a cylindrical metal flange 34. This flange 34 makes a fluid-tight seal with the insulating block 32 and it serves to attach the terminal assemblies 28 to the top wall 16 of the transformer 10 by welding the flange 34 to the top 16 of the transformer casing 11, as indicated at 36.

The first or lower end of the first elongated conducting member 30 extends within the casing 11 and is provided with a hole 38 which permits the lower end of the member 30 to be attached to one end of the secondary winding 22, by means of a bolt or other suitable connecting means. The second or upper end of the elongated conducting member 30 extends upwardly from the outside of the transformer casing 11 and is provided with a plurality of second elongated conducting members or studs 40. The studs 40 are mounted in the elongated conducting member 30 at spaced intervals by providing threaded holes through the member 30. The studs or elongated conductors 40 are provided with threads as indicated at 41. The studs or conductors 40 are screw threaded into the holes in the elongated conductor 30 until approximately an equal portion of the studs or second elongated electrical conductors 40 extends on each side of the elongated conductor member 30. Then the threads 41 of the studs or second conductor members 40 are staked, as indicated at 42, to prevent the studs or second elongated conductors 40 from being screwed out of the holes in the first elongated member 30. This staking of the threads on the studs 40 is indicated at 42 and merely comprises destroying the threads on the studs or second elongated conductor members 40 so that they may not be screwed out of the holes in the elongated conductor member 30.

In FIG. 2 one of the studs or second conductor members 40 is shown in cross-section to more clearly indicate how the threads on the members 40 are staked at 42.

As seen from FIGS. 1, 3, 4 and 5 the studs or second elongated conductor members 40 are spaced far enough apart along the length of the upper end of the first elongated conductor member 30 to permit easy installation of secondary conductors to each of the studs or second elongated conducting members 40 without crowding or endangering other secondary conductors or service lines. It is also seen from FIGS. 1, 3, 4 and 5 that the studs or second elongated conductor members 40 extend on each side of the condutcor 30 and are substantially transverse to the second or upper end of the conductor member 30. This permits the secondary conductors or service lines to be conveniently and easily connected to the ends of the members 40.

FIG. 1 illustrates a pair of service conductors 46 and 48 connected to one of the studs or second elongated conductor members 40 on each of the secondary terminal assemblies 28. The conductors 46 and 48 comprise the load circuit for providing service to a particular customer. As seen from FIG. 1, if desired a load circuit for another customer may be connected to the transformer by connecting another pair of service leads to the same stud or elongated conductors 40 to which the leads 46 and 48 are connected. With the installation shown in FIG. 1 a minimum of eight customers may be connected to the members 40 of the terminal assemblies 28 of the transformer 10 to provide eight separate circuits without requiring any auxiliary connectors or make shift arrangements.

FIG. 3 illustrates in more detail how a secondary circuit, such as the lead 48 shown in FIG. 1, may be connected to one of the members 40. The lead 48 is merely placed adjacent one side of the member 40 and a cable clamp 49 encloses the member 40 and the lead 48 and as a screw 50 of the cable clamp 49 is tightened down, the lead 48 is clamped tightly against the member 40 to provide good electrical connection. The threads 41 on the stud or elongated conductor member 40 enhance good electrical connection between the member 40 and the lead 48 by biting into the lead 48 as the screw 50 of the clamp 49 is tightened down.

FIG. 4 illustrates another method of attaching a cable or secondary circuit 48 to the member 40. In this illustration the end of the cable 48 is provided with a tubular connector 52 which is placed over the member 40. The tubular connector 52, after it has been placed over the member 40, is crimped down onto the member 40, as indicated at 54, to cause the threads on the stud 40 to bite into the tubular connector 52 and provide good electrical connection between the stud or secondary electrical connector member 40 and the tubular connector 52.

FIG. 5 illustrates still another method of connecting a cable or secondary circuit 48 to a terminal assembly as provided by this invention. It this embodiment the studs or secondary elongated conductor members 40 are hollow and the cable 48 is merely stripped of insulation and the base conductor is inserted into the hollow studs or secondary elongated connectors 40 and the stud or secondary electrical elongated connectors 40 and the stud or secondary electrical elongated connector 40 is crimped down onto the cable as indicated at 56 to provide good electrical connection between the studs or secondary elongated electrical connectors 40 and the cable 48.

FIG. 6 illustrates still another method of connecting a cable or secondary circuit 48 to a terminal assembly provided by this invention. In this embodiment a cable 48 has a flat terminal member 58 on its end. The flat terminal member 58 has a hole 60 thereon which receives the stud 40, and a nut 62 is threaded on the stud 40 and tightened down to maintain good electrical contact between the flat terminal 58 and the elongated conductor member 30.

From the foregoing description taken in connection with the drawings it is seen that this invention has provided an improved terminal assembly for connecting a plurality of secondary or load circuits to the secondary of a distribution transformer to provide a plurality of individual customer's service circuits. The service currents may be connected to the secondary terminal assemblies of the transformer without having to provide a plurality of auxiliary connectors or other makeshift connections. The terminal assembly provided by this invention not only provides a neater and cheaper terminal assembly for connecting a plurality of individual customers to the common terminals of the distribution transformer but it also provides a safer terminal assembly wherein service personnel may more safely connect and service the connections than with the prior art devices.

I claim as my invention:

1. A terminal assembly for connecting load circuits to electrical apparatus housed in a closed casing, said terminal assembly comprising an insulating member, means for attaching said insulating member to a wall of the casing, a first elongated conductor member extending through said insulating member, said first conductor member having first and second end portions, means for connecting the first end portion of said conductor member to electrical apparatus, and a plurality of terminal means permanently attached to and spaced longitudinally on said second end portion and projecting from each side of said second end portion substantially transverse to said second end portion for connecting the second end portion of said elongated conductor member to a plurality of load circuits.

2. A terminal structure as specified in claim 1, wherein said terminal means for connecting said second end portion of said first elongated conductor member to a plurality of load circuits comprises a plurality of second elongated threaded conductor members spaced along said second end portion of said first elongated conductor member and electrically connected to said second end portion of said first elongated conductor member, said second elongated conductor members being substantially transverse to said second end portion of said first elongated conductor member with threaded portions extending on two sides of said first elongated conductor member, to which threaded portions of said second elongated conductor members separate load circuits may be connected.

3. A terminal assembly as specified in claim 1, wherein said means for connecting said elongated conductor to a plurality of load circuits comprises at least four threaded elongated conductor members spaced along the second end portion of said first elongated conductor member and electrically connected to said second end portion of said first elongated conductor member, said threaded elongated conductor members being substantially transverse to said first elongated conductor member with portions of each of said threaded elongated conductor members extending on two sides of said first elongated conductor member, to which threaded portions of said elongated conductor members separate load circuits may be connected.

References Cited

UNITED STATES PATENTS

| | | | |
|---|---|---|---|
| 1,934,581 | 11/1933 | Bach | 174—145 |
| 2,740,001 | 3/1956 | Vergilio et al. | |
| 3,414,868 | 12/1968 | Howe | 174—145 X |
| 3,422,392 | 1/1969 | Woods. | |
| 3,433,893 | 3/1969 | Hofmann et al. | 174—153 |

FOREIGN PATENTS

| | | |
|---|---|---|
| 284,897 | 2/1928 | Great Britain. |

LARAMIE E. ASKIN, Primary Examiner

U.S. Cl. X.R.

174—145; 339—242